(12) United States Patent
Huang

(10) Patent No.: US 6,957,777 B1
(45) Date of Patent: Oct. 25, 2005

(54) LABEL TO BE ATTACHED ON A PLASTIC PRODUCT FORMED IN A MOLD AND IDENTIFIABLE BY A DETECTING DEVICE

(75) Inventor: Sheng-Chang Huang, Tainan (TW)

(73) Assignees: Huang, Sheng-Chang, Tainan (TW); Supreme Technic Package Co., Ltd., Tainan (TW)

( * ) Notice: Subject to any disclaimer, the term of this patent is extended or adjusted under 35 U.S.C. 154(b) by 30 days.

(21) Appl. No.: 10/946,795

(22) Filed: Sep. 21, 2004

(51) Int. Cl.[7] .............................. G06K 19/06
(52) U.S. Cl. ................. 235/492; 235/472.02; 235/375; 235/487; 340/572.1; 340/572.8
(58) Field of Search .................. 340/572.1, 572.7, 340/572.8, 572.9; 235/472.02, 375, 487, 235/492; 283/81; 156/60, 62.2; 257/678–679, 257/787; 438/106; 428/139

(56) References Cited

U.S. PATENT DOCUMENTS

| | | | | |
|---|---|---|---|---|
| 4,954,814 | A * | 9/1990 | Benge ...................... 370/572.3 |
| 5,971,437 | A * | 10/1999 | Sakashita ...................... 283/81 |
| 5,973,599 | A * | 10/1999 | Nicholson et al. ....... 340/572.8 |
| 6,100,804 | A * | 8/2000 | Brady et al. ............. 340/572.7 |
| 6,121,880 | A * | 9/2000 | Scott et al. .............. 340/572.5 |
| 6,163,260 | A * | 12/2000 | Conwell et al. ......... 340/572.8 |
| 6,206,292 | B1 * | 3/2001 | Robertz et al. ............. 235/488 |
| 6,255,949 | B1 * | 7/2001 | Nicholson et al. ....... 340/572.8 |
| 6,395,373 | B2 * | 5/2002 | Conti et al. ................. 428/138 |
| 6,509,217 | B1 * | 1/2003 | Reddy ........................ 438/153 |
| 6,594,370 | B1 * | 7/2003 | Anderson .................... 381/315 |
| 6,657,170 | B2 * | 12/2003 | Clothier ...................... 219/622 |
| 6,820,314 | B2 * | 11/2004 | Ferguson et al. .......... 29/25.42 |
| 6,836,215 | B1 * | 12/2004 | Laurash et al. .......... 340/572.1 |
| 2003/0106204 | A1 * | 6/2003 | Ferguson et al. ............. 29/601 |
| 2004/0004131 | A1 * | 1/2004 | Emmert ...................... 235/492 |
| 2004/0041262 | A1 * | 3/2004 | Okamoto et al. ........... 257/737 |
| 2004/0052034 | A1 * | 3/2004 | Senba et al. ................ 361/600 |
| 2004/0074974 | A1 * | 4/2004 | Senba et al. ................ 235/492 |
| 2004/0094949 | A1 * | 5/2004 | Savagian et al. ............. 283/81 |
| 2004/0100415 | A1 * | 5/2004 | Veitch et al. ............... 343/850 |
| 2004/0188531 | A1 * | 9/2004 | Gengel et al. .............. 235/491 |
| 2004/0217865 | A1 * | 11/2004 | Turner ..................... 340/572.7 |
| 2004/0244865 | A1 * | 12/2004 | Jung et al. ............. 139/426 R |
| 2005/0025943 | A1 * | 2/2005 | Krappe et al. .............. 428/209 |

OTHER PUBLICATIONS http://www.m-source.com/EDS/atg023minfo.html.*

* cited by examiner

*Primary Examiner*—Karl D. Frech
*Assistant Examiner*—Daniel Walsh
(74) *Attorney, Agent, or Firm*—J.C. Patents

(57) ABSTRACT

A label to be attached on a plastic product formed in a mold and identifiable by a detecting device includes a soft circuit board, a protective layer and an adhesive layer. The soft circuit board has its outer surface provided with a radio frequency identifiable device (RFID). The protective layer is transparent, adhered on the outer surface of the soft circuit board for protecting and enabling RFID identified by a signal transmitted by a wireless detecting device. The adhering layer is made of a compound material and adhered on an inner layer for protecting the inner surface of the soft circuit board and the RFID as well. The label is attached on a plastic product during injecting molding process, widely usable for identifying an object affixed with the label by means of a detecting device.

5 Claims, 8 Drawing Sheets

LABEL TO BE ATTACHED ON A PLASTIC PRODUCT FORMED IN A MOLD AND IDENTIFIABLE BY A DETECTING DEVICE

FIELD OF THE INVENTION

This invention relates to a label to be attached on a plastic product formed in a mold and identifiable by a detecting device, particularly to one having a radio frequency identifiable device provided on an outer surface of the label. The label includes the soft circuit board, a protective layer fixed on the outer surface of the soft circuit board, and an adhering layer fixed on an inner surface to be adhered on a plastic product. Then the label with a plastic product can be affixed on by an object such as a container, an appliance, etc. so as to permit the object identified by a radio-frequency signal transmitted by a detecting device.

BACKGROUND OF THE INVENTION

Labels to be attached on a plastic product are widely used nowadays on various commodities for speeding circulation, identification, confirmation and classification of products. Conventional labels to be attached on a plastic product and identifiable by a wireless detecting device are generally have a soft circuit board with its outer surface adhered with a wireless identifiable chip, and then the soft circuit board is adhered on an object or a commodity, and the outer surface of the soft circuit board is coated with a protective layer for protecting the wireless identifiable chip from destroyed or wearing.

The drawback of the conventional labels provided with a wireless identifiable chip is manual work for gluing the protective layer on the soft circuit board, which needs much manual labor to worsen productive efficiency and raising its cost.

SUMMARY OF THE INVENTION

This invention has been devised to offer a label to be attached on a plastic product formed in a mold and identifiable by a detecting device, in order to facilitate its use and to boost producing efficiency.

One feature of the invention is a radio frequency identifiable device fixed on an outer surface of a soft circuit board of the label, and a protective layer formed on an outer surface of the soft circuit board, and adhesive layer fixed on an inner surface of the soft circuit board.

Another feature of the invention is the label to be attached on a plastic product formed in a mold during molding process, becoming integral with a plastic product, and with the adhering layer adhered on the plastic product.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
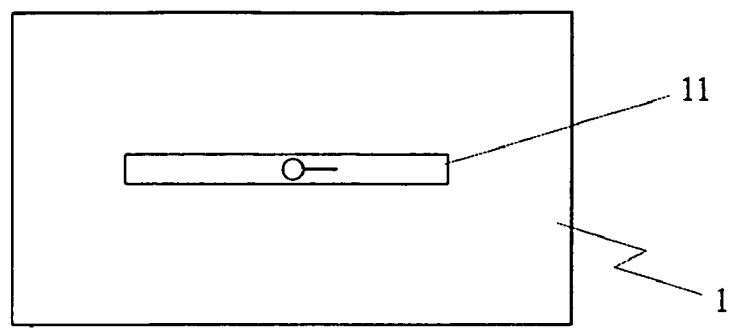
FIG. 1 is an upper side view of a first embodiment of a label in the present invention.
Figure 2:
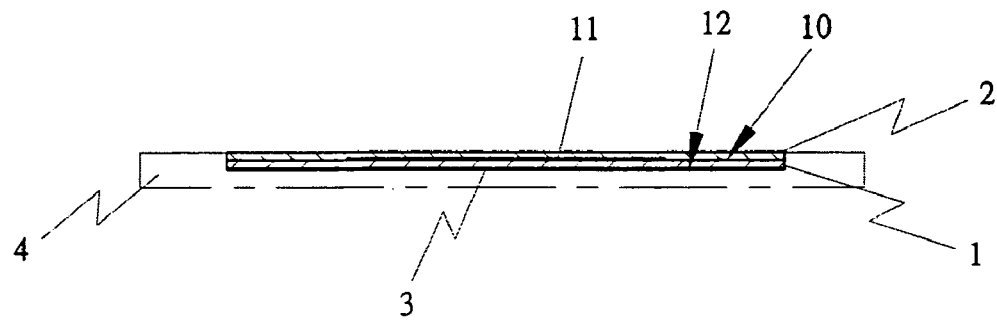
FIG. 2 is a cross-sectional of the first embodiment of a label in the present invention.

A first embodiment of a label (A) to be attached to a plastic product formed in a mold and identifiable by a detectable device in the present invention, as shown in FIGS. 1 and 2, includes a soft circuit board 1, a protective layer 2 and an adhesive layer 3 combined together.

The soft circuit board 1 has an outer surface 10, and a radio frequency identifiable device (RFID) 11 composing of a radio frequency identifiable chip and an antenna. The radio frequency identifiable chip is adhered on the outer surface of the soft circuit board 1, possible to be a read-only-memory (ROM) or read-accessible-memory (RAM) chip according to the condition needed.

The protective layer 2 is fixed on the outer surface of the soft circuit board 1 and the RFID 11 for protecting the RFID 11 from wearing and tearing, transparent so as to permit the RFID 11 identifiable by a transmitted signal sent by a detecting device.

Figure 3:
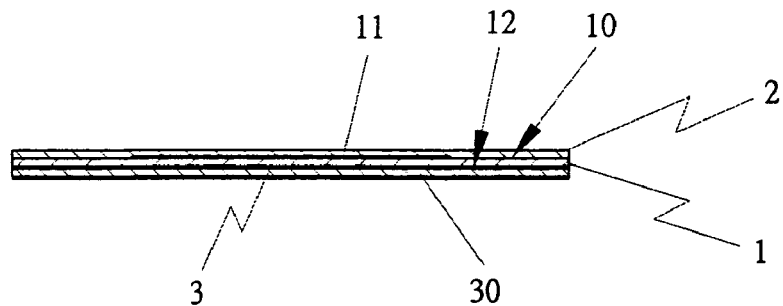
FIG. 3 is a cross-sectional view of a second embodiment of a label in the present invention.

The adhesive layer 3 is fixed on an inner surface of the soft circuit board 1 for protecting the inner surface and for adhering the label (A) on a plastic product formed in a mold during the molding process. The adhesive layer 3 can be a single layer as shown in FIG. 2, or added with an auxiliary layer 30 as shown in FIG. 2 to have a double layer as shown in FIG. 3. Further, the adhesive layer 3 and the auxiliary layer 30 is made of heat-insulating material, which may be unwoven cloth, or foam material or any material having heat-insulating function for protecting the RFID 11 from burned by high temperature. In case of a double adhesive layer, only the adhesive layer 3 or the auxiliary layer 30 is made of a heat-insulating material to cut the cost and its thickness.

Next, the finished label (A) in the invention is placed in a mold used for injecting molding, pushing molding, vacuum molding or blowing molding a plastic product 4, and attached on the plastic product 4 as integral after finished molding.

Figure 4:
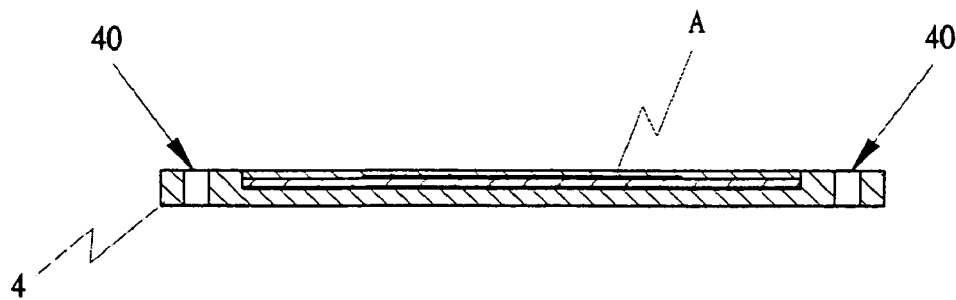
FIG. 4 is a perspective view of the label in the present invention being applied and affixed to an object.
Figure 5:
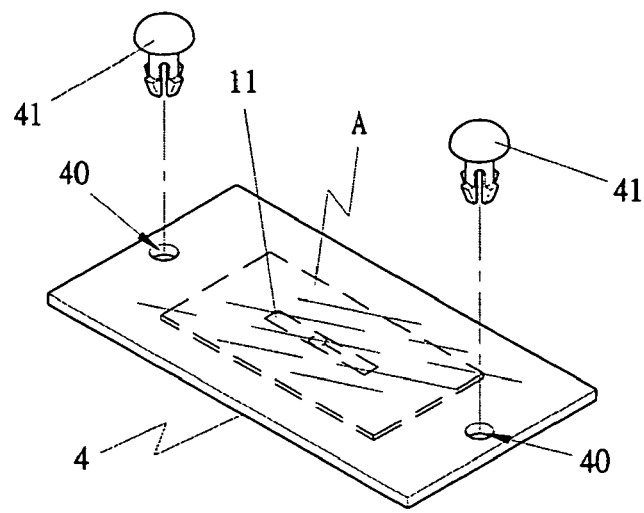
FIG. 5 is a perspective view of the label in the present invention being applied and affixed to an object as shown in FIG. 4 in a first mode.

Now, how the label (A) attached on a plastic product is utilized will be described. A first mode of utilizing the label (A) attached on the plastic product in the present invention is to have the plastic product 4 bored with plural holes 40 at two opposite sides, as shown in FIGS. 4 and 5. Then the label (A) with the plastic product 4 is affixed to an object 5 by means fastening members 41 so that the object 5 is provided with the RFID of the label (A), without extra processing needed for the object 5.

Figure 6:
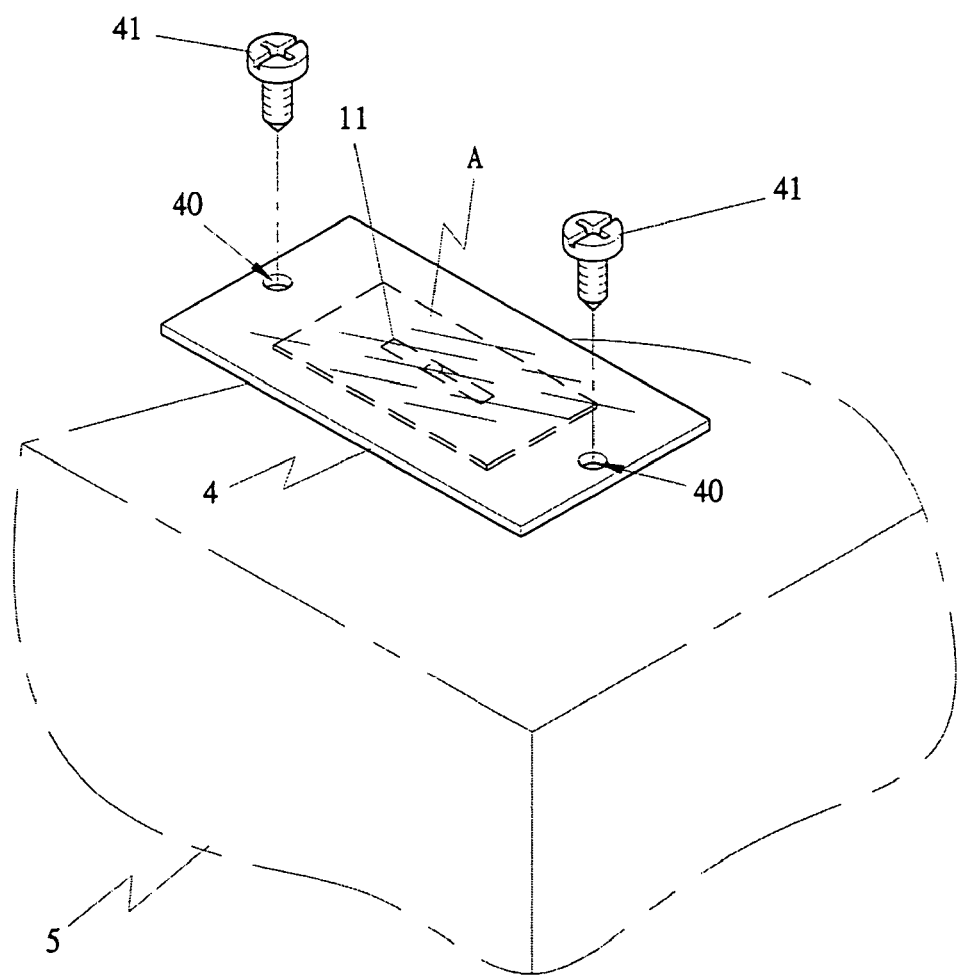
FIG. 6 is a perspective view of the label in the present invention being applied and affixed to object in a second mode.

Next, FIG. 6 shows a second mode of utilizing the label (A) with the plastic product 4. The plastic product 4 is bored with plural holes 40 in the same way as the first mode, with screws 41 as shown in FIG. 6 screwing with the holes 40 so as to affix it to an object 5, which can then be easily identified by a transmitted signal sent by a detecting device.

Figure 7:
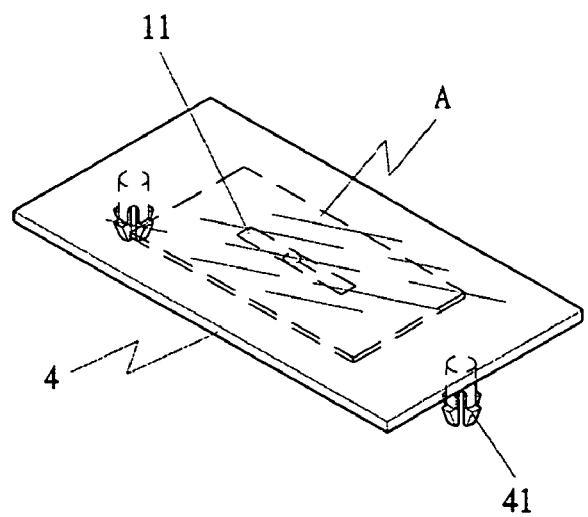
FIG. 7 is a perspective view of the label in the present invention being applied and affixed to object in a third mode.

Further, FIG. 7 shows a third mode of utilizing the label (A) with a plastic product 4 in the present invention, wherein the plastic product 4 formed with a fastening member 41 as integral first, and then whole label (A) with the plastic product 4 with the fastening member 41 is to be affixed to an object 5, which is then possible to be easily identified by a transmitted signal sent by a detecting device.

Figure 8:
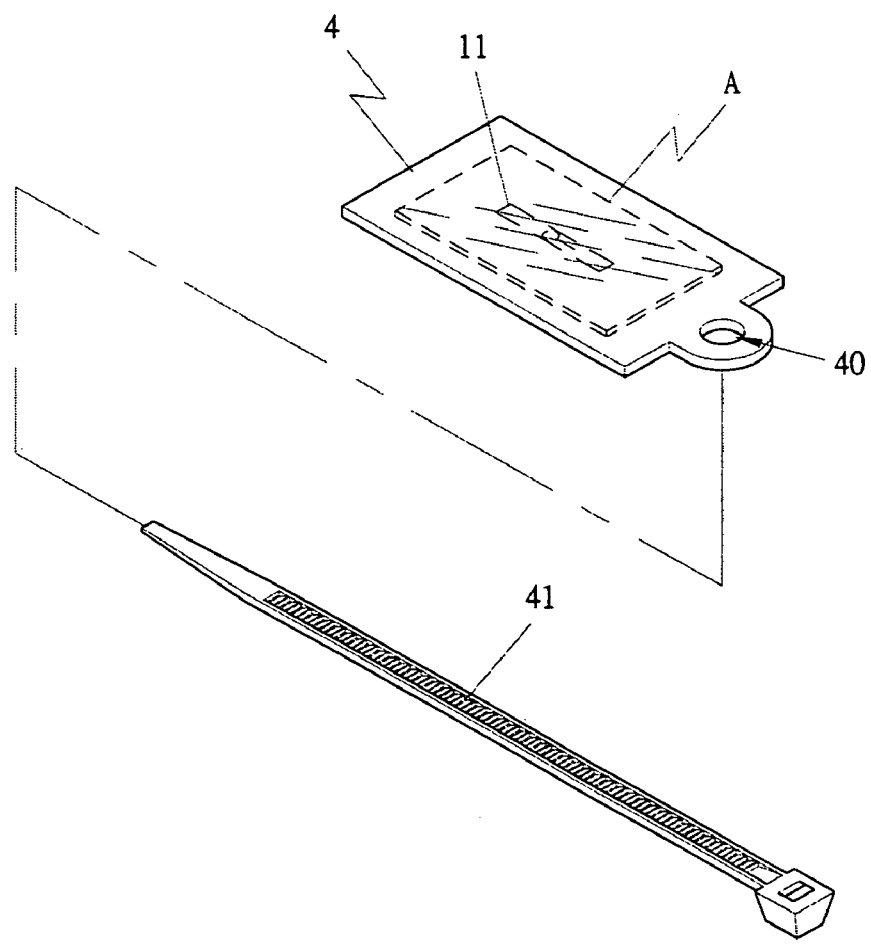
FIG. 8 is an exploded perspective view of the label in the present invention being applied and affixed to object in a fourth mode.
Figure 11:
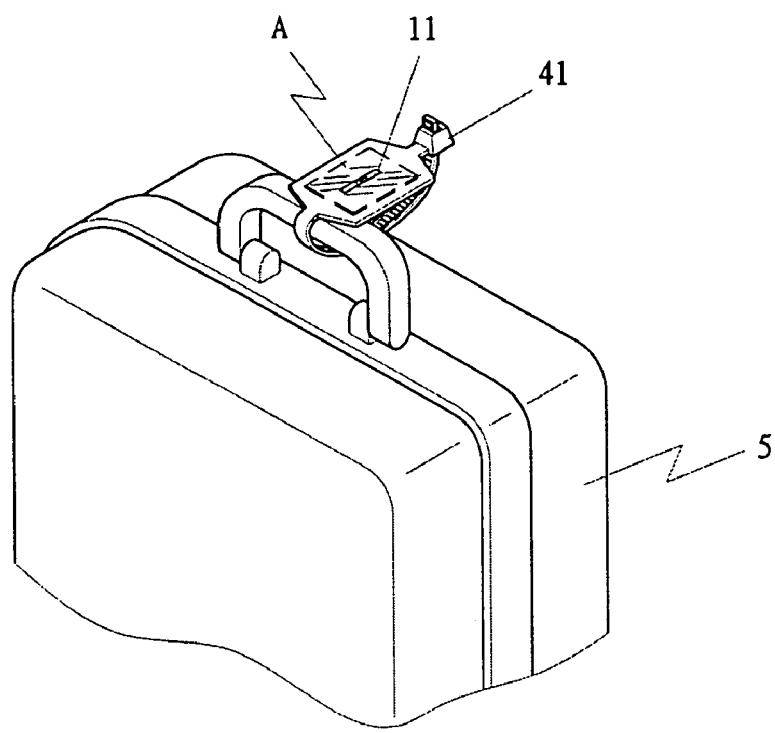
FIG. 11 is a perspective view of the label in the present invention being affixed to an object in the sixth mode.

Next, FIG. 8 shows a fourth mode of utilizing the label (A) with a plastic product 4, with the plastic product first formed with a hole 40 at one side, and then an elongate fastening member 41 shown in FIG. 8 is used to affix the label (A) with the plastic product 4 to an object 5 such as a baggage, as shown in FIG. 11. Thus, the object 5 can be easily identified by a wireless detecting device. In case the label (A) with the plastic product 4 should be needed to be reused, the fastening member 41 can be cut off the object 5, letting the label (A) with the plastic product 4 usable again by using any of the utilizing modes described so far.

Figure 9:
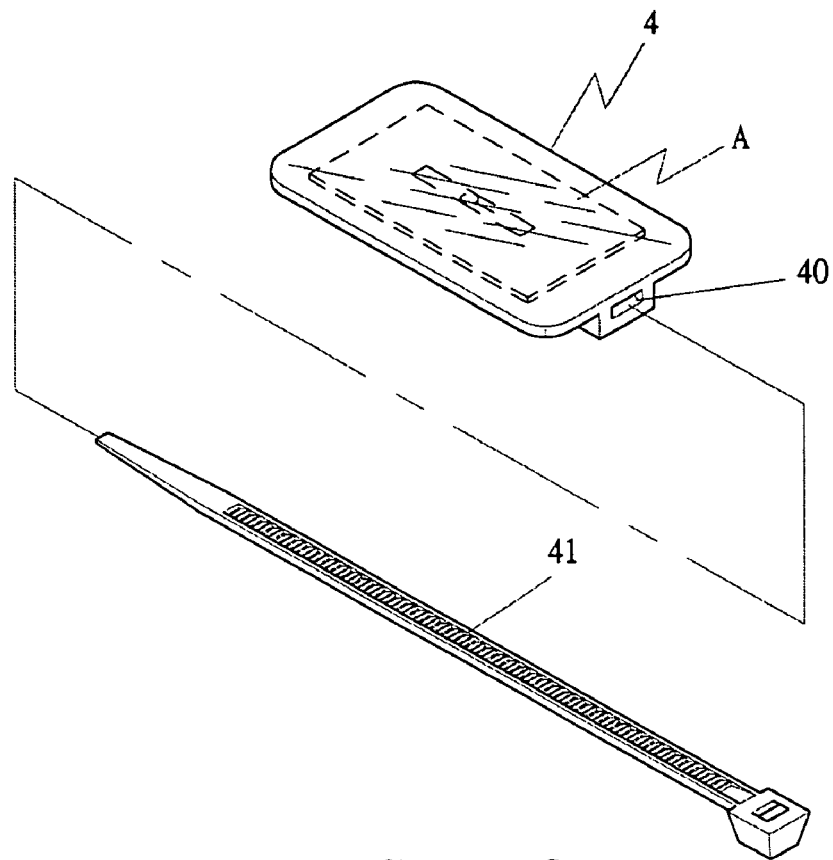
FIG. 9 is an exploded perspective view of the label in the present invention being applied and affixed to an object in a fifth mode.

FIG. 9 shows a fifth mode of utilizing the label (A) with the plastic product 4 for affixing to an object 5, and the plastic product 4 has a groove 40 formed under one side of the plastic product 4 for an elongate fastening member 41 shown in FIG. 9 to fit therein for affixing the label (A) with the plastic product 4 to an object 5 by means of the elongate fastening member 41, letting the object easily identifiable by a wireless detecting device. Then the elongate fastening member 41 is also removable so as to let the label (A) reusable as the fourth mode shown in FIG. 8.

Figure 10:
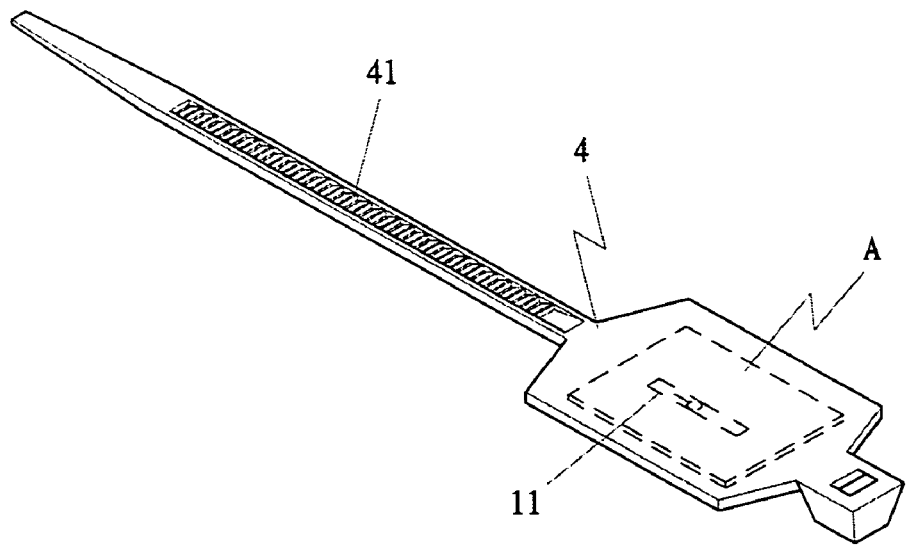
FIG. 10 is a perspective view of the label in the present invention applied and affixed to an object in a sixth mode.
Figure 12:
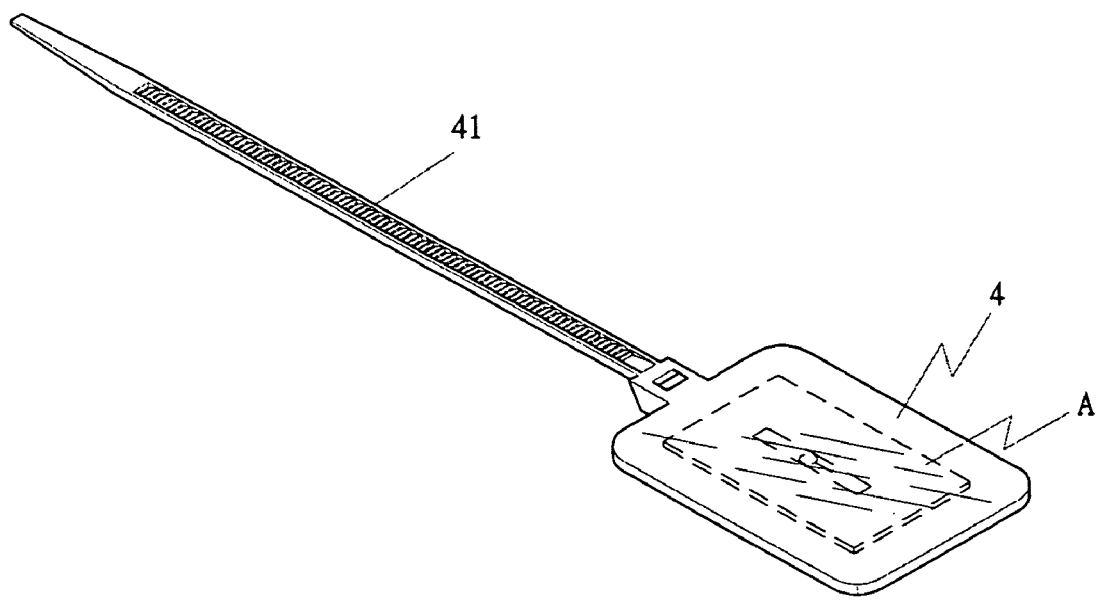
FIG. 12 is a perspective view of the label in the present invention being applied and affixed to an object in a seventh mode.

Moreover, FIGS. 10, 11 and 12 show respectively a sixth, a seventh mode of utilizing the label (A) with the plastic product 4 to be affixed to an object 5 needed to be identified by a wireless detecting device, which transmits a radio frequency signal to the RFID 11 provided in the label (A).

Figure 13:
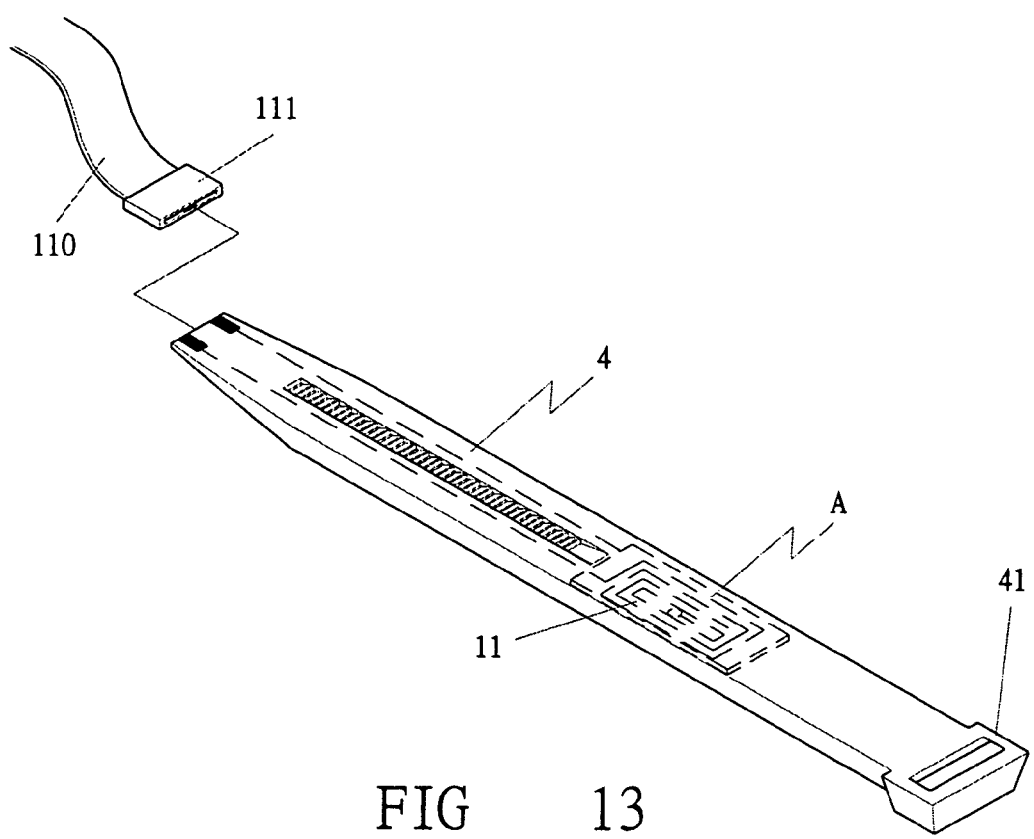
FIG. 13 is a perspective view of the label in the present invention being applied and affixed to an object in an eighth mode.
Figure 14:
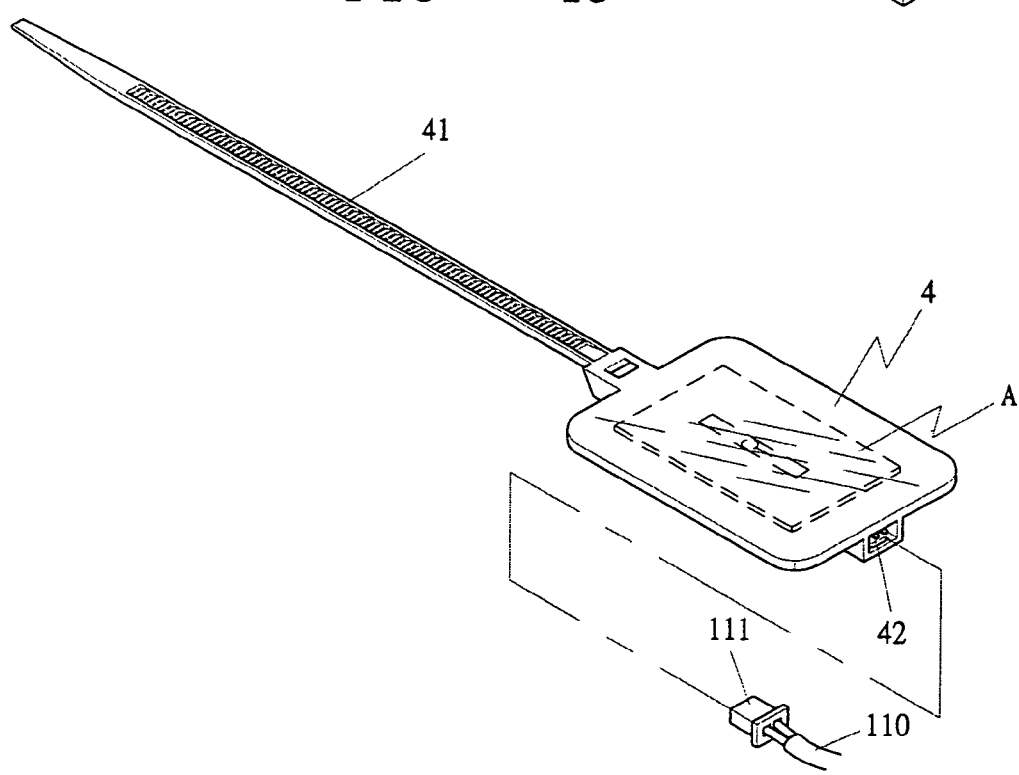
FIG. 14 is a perspective view of the label in the present invention being applied and affixed to an object in a ninth mode.
Figure 15:
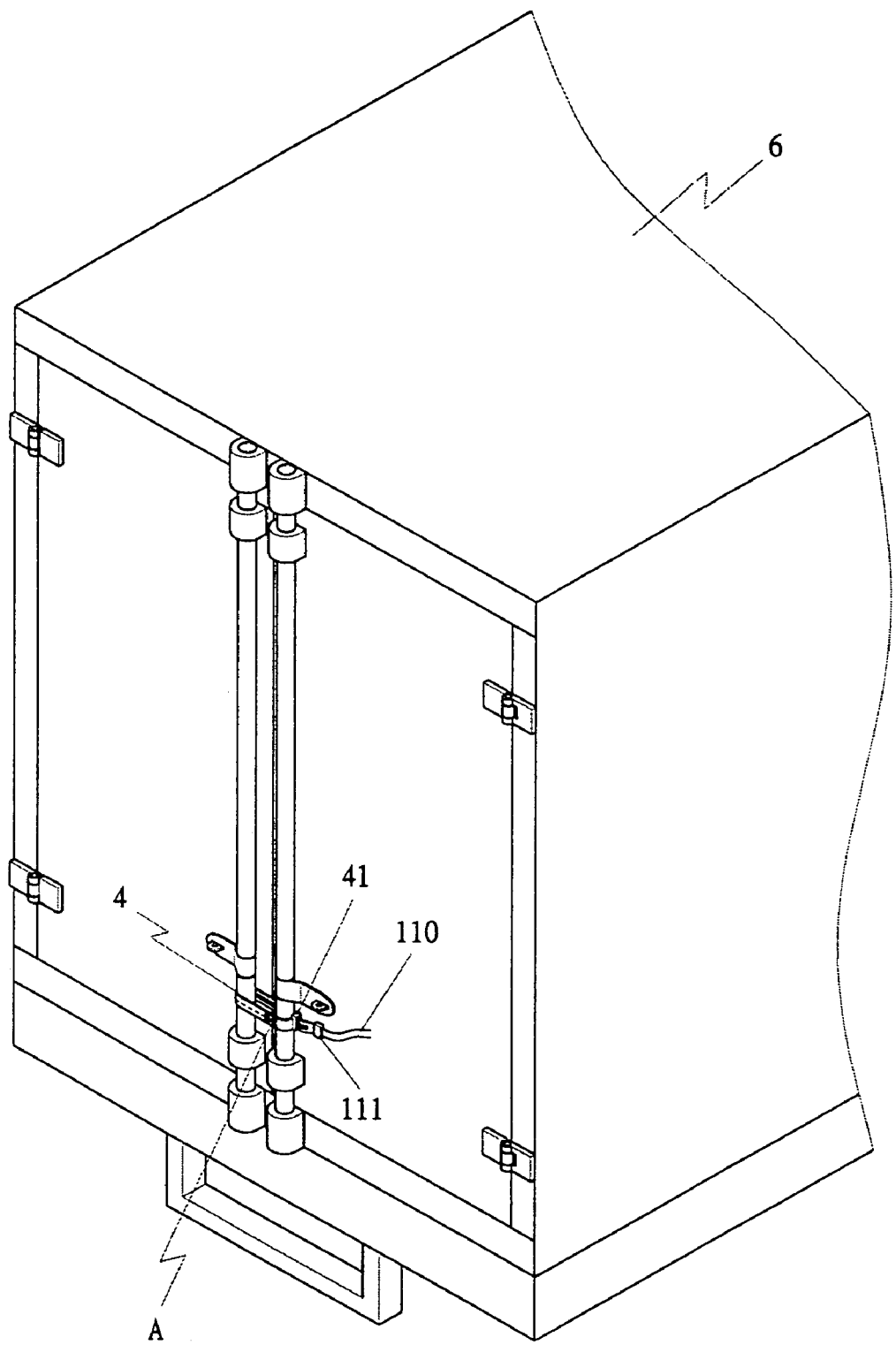
FIG. 15 is a perspective view of the label in the present inventin affixed to an object in the eight mode; and, FIG. 16 is a perspective view of the label in the present invention applied and affixed to an object like a bucket.

FIGS. 13 and 14 show respectively an eighth and a ninth mode of utilizing the label (A) with the plastic product 4 formed with an elongate fastening member 41 to be affixed to an extraordinary large object 6 as shown in FIG. 15. Then the extraordinary large object 6 such as a container can be identified with ease by a wireless detecting device sending a signal to be received by the RFID 11 of the label (A) through the antenna 110. The antenna 110 is provided with a male or female coupling 111 to be directly combined with the plastic product 4 as shown in FIG. 13, or to be connected to a female or male coupling 42 formed with the plastic product 4, as shown in FIG. 14. Then the antenna 110 is extended substantially long, and its length depends on the place where the label (A) with the plastic product 4 is used. In case of an object 6 like a container, the antenna 110 has a length enough for extending from the rear end of the container 6 to the vehicle head to facilitate transmitted signals by a detecting device received by the RFID of the label (A).

Figure 16:
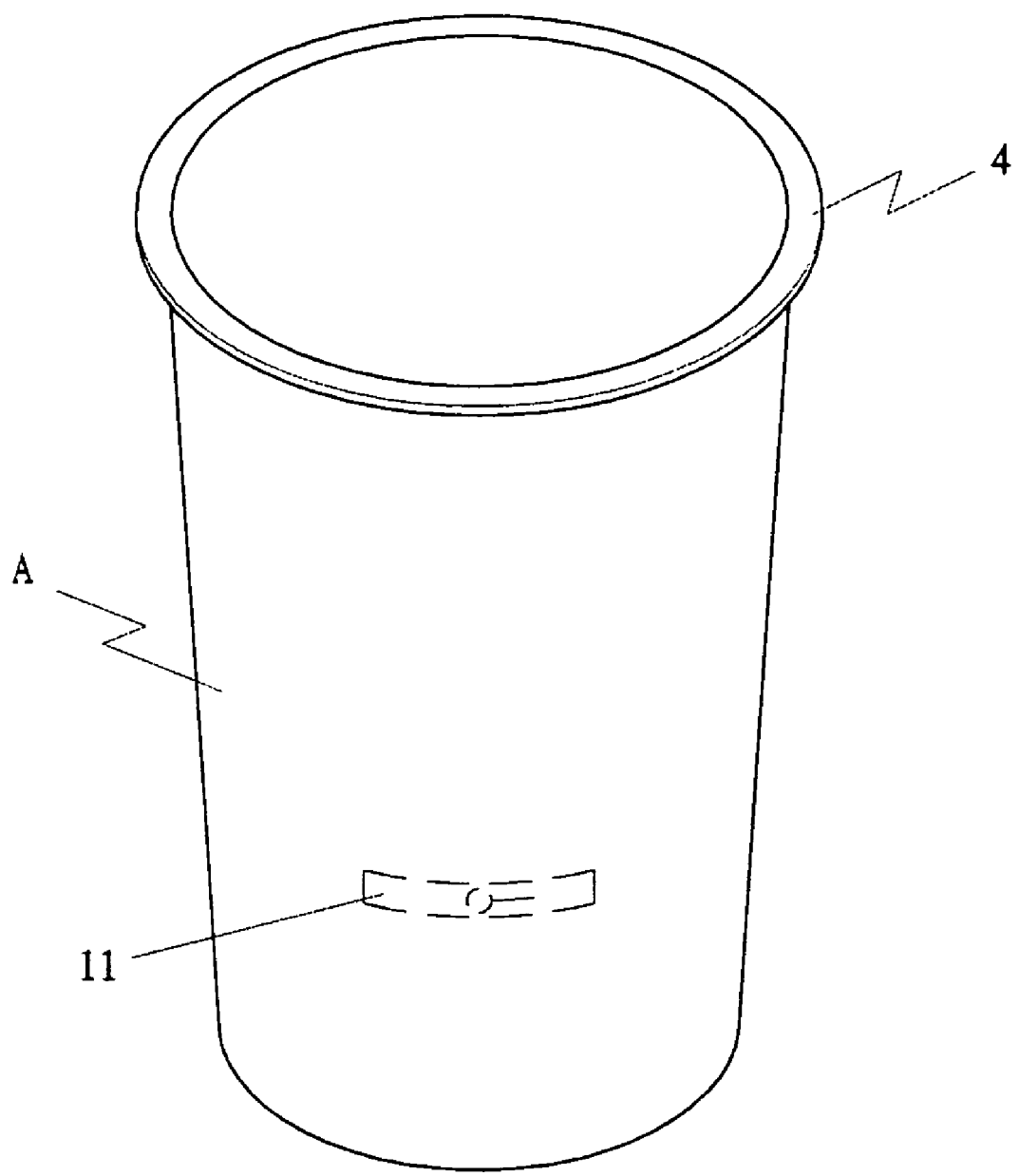

Lastly, FIG. 16 shows a ninth mode of utilizing the label (A) with the plastic product 4 formed as a conventional plastic bucket. Practically, the label (A) can be applied to any thing, directly applied to any plastic product 4 that is formed in a mold, by injecting molding, pushing molding, blowing molding, or vacuum molding so that the plastic product 4 is provided with the RFID 11 for easily identifiable by a detecting device, and for keeping the product 4 from stolen or lost accidentally.

While the preferred embodiments of the invention have been described above, it will be recognized and understood that various modifications may be made therein and the appended claims are intended to cover all such modifications that may fall within the spirit and scope of the invention.

What is claimed is:

1. A label to be attached on a plastic product formed in a mold and identifiable by a detecting device, said label comprising:
   a soft circuit board having an outer surface provided with a radio frequency identifiable device;
   a protective layer provided to be fixed on the outer surface of said soft circuit board; and,
   a first adhesive layer made of heat-insulating material provided to be fixed on an inner surface of said soft circuit board.

2. The label to be attached on a plastic product formed in a mold and identifiable by a detecting device as claimed in claim 1, wherein said first adhesive layer is single layered.

3. The label to be attached on a plastic product formed in a mold and identifiable by a wireless detecting device as claimed in claim 1, wherein a second adhesive layer is applied between the inner surface of said soft circuit board and said first adhesive layer, forming a double adhesive layer, wherein the second adhesive layer is in direct contact with the first adhesive layer.

4. The label to be attached on a plastic product formed in a mold and identifiable by a detecting device as claimed in claim 1, wherein said first adhesive layer comprises unwoven cloth.

5. The label to be attached on a plastic product formed in a mold and identifiable by a detecting device as claimed in claim 1, wherein said first adhesive layer comprises foam material.

* * * * *